(12) United States Patent
Frye

(10) Patent No.: US 8,859,898 B2
(45) Date of Patent: Oct. 14, 2014

(54) POWER TRANSMISSION LINE COVERS AND METHODS AND ASSEMBLIES USING SAME

(71) Applicant: Tyco Electronics Corporation, Berwyn, PA (US)

(72) Inventor: Terry Edward Frye, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 141 days.

(21) Appl. No.: 13/623,794

(22) Filed: Sep. 20, 2012

(65) Prior Publication Data

US 2014/0076604 A1    Mar. 20, 2014

(51) Int. Cl.
*H02G 3/14*    (2006.01)

(52) U.S. Cl.
USPC ........ 174/68.3; 138/128; 174/99 R; 174/68.1; 439/207

(58) Field of Classification Search
USPC ........ 138/128, 166, 167, 168; 174/68.1, 68.3, 174/99 R; 439/207
See application file for complete search history.

(56) References Cited

U.S. PATENT DOCUMENTS

| | | |
|---|---|---|
| 1,224,970 A | 5/1917 | Singer |
| 1,485,994 A | 3/1924 | Salisbury |
| 2,408,253 A | 9/1946 | Diebold |
| 2,770,667 A | 11/1956 | Runde |
| RE24,613 E | 3/1959 | Hageltorn |
| 2,927,146 A | 3/1960 | Salisbury |
| 3,089,915 A | 5/1963 | Plummer |
| 3,428,742 A | 2/1969 | Smith |
| 3,459,870 A | 8/1969 | Plummer |
| 3,517,702 A * | 6/1970 | Trimble et al. ............... 138/128 |
| 3,587,657 A | 6/1971 | Staller |
| 3,682,434 A * | 8/1972 | Boenig ........................... 249/48 |
| 3,786,171 A | 1/1974 | Shira |
| 3,846,575 A | 11/1974 | Troy |
| 3,900,697 A | 8/1975 | Yotsugi |

(Continued)

FOREIGN PATENT DOCUMENTS

| | | |
|---|---|---|
| DE | 2812524 A | 9/1979 |
| FR | 1585394 A | 1/1970 |
| IT | 571894 | 1/1958 |

OTHER PUBLICATIONS

"MVLC Medium Voltage Line Cover" TE Connectivity Energy, 1308377 E113 Apr. 2011 (2 pages).

(Continued)

*Primary Examiner* — Dhirubhai R Patel
(74) *Attorney, Agent, or Firm* — Myers Bigel Sibley & Sajovec, P.A.

(57) ABSTRACT

A power transmission line cover includes an elongate, flexible panel and first and second elongate, integral edge portions. The first edge portion includes an elongate first latch feature and the second edge portion includes an elongate second latch feature. The cover includes an elongate inner creepage extender wall forming a part of one of the first and second edge portions, and an elongate outer creepage extender wall forming a part of one of the first and second edge portions. The flexible panel is wrapped about a power line and the edge portions are joined together to form a longitudinally extending closure seam wherein the latch features are coupled and the edge portions form an electrical creepage path extending from the chamber to an exterior boundary of the cover along the inner creepage extender wall, between the first and second latch features, and along the outer creepage extender wall.

20 Claims, 4 Drawing Sheets

(56) References Cited

U.S. PATENT DOCUMENTS

| | | | |
|---|---|---|---|
| 4,391,303 A | 7/1983 | Holgersson | |
| 4,399,840 A | 8/1983 | Lee | |
| 4,422,478 A | 12/1983 | Pentney et al. | |
| 4,453,353 A | 6/1984 | Killop et al. | |
| 4,581,481 A | 4/1986 | Moretti | |
| 4,628,145 A | 12/1986 | Kolcio et al. | |
| 4,865,890 A * | 9/1989 | Erlichman | 428/35.1 |
| 4,944,976 A * | 7/1990 | Plummer, III | 428/36.9 |
| 5,505,230 A | 4/1996 | Bartholomew | |
| 5,566,622 A | 10/1996 | Ziaylek, Jr. et al. | |
| 5,626,167 A | 5/1997 | Streit | |
| 5,878,465 A * | 3/1999 | Jenner | 24/16 PB |
| 6,020,560 A | 2/2000 | Kamel et al. | |
| 6,094,792 A | 8/2000 | Frye et al. | |
| 6,195,861 B1 | 3/2001 | Frye et al. | |
| 6,239,357 B1 | 5/2001 | Mabry, III et al. | |
| 6,730,852 B1 | 5/2004 | Puigcerver et al. | |
| 7,297,869 B2 | 11/2007 | Hiller et al. | |
| 7,456,363 B2 | 11/2008 | Nishiguchi et al. | |

OTHER PUBLICATIONS

"MVLC 15-25 kV Medium Voltage Line Cover for Bare Conductors" Raychem Corporation, PII-55066, Rev AA, PCN 360247-000, Effective Date: May 11, 1999 (11 pages).

Raychem Electrical Products Division, Raysulate Product Handbook, Third Edition, Chapter 3, "Overhead line insulation tapes and covers," No date, Admitted prior art (16 pages).

\* cited by examiner

POWER TRANSMISSION LINE COVERS AND METHODS AND ASSEMBLIES USING SAME

FIELD OF THE INVENTION

The present invention relates generally to insulating covers and, more particularly, to insulating covers for power transmission lines.

BACKGROUND OF THE INVENTION

Electrical power may be transmitted from a generation source to consumers via overhead conductors strung between towers or poles. Electrical power is typically transmitted in phases wherein multiple conductors are utilized. One or more of these conductors are "hot" conductors carrying a specified amount of alternating current electric power and one conductor serves as a ground. Flashover may result if contact is made between hot conductors or between hot conductors and other grounded objects. Non-grounded contact with a hot conductor, such as when a bird sits upon a hot conductor, typically does not result in flashover.

Because uninsulated conductors are typically less expensive than insulated conductors, many electric power suppliers utilize uninsulated conductors for power transmission. With often hundreds of miles of transmission power lines, the use of uninsulated conductors can result in large cost savings to electric power suppliers. Uninsulated conductors are typically strung between towers or poles such that there is sufficient clearance between the conductors to avoid contact therebetween or with grounded objects.

Although bare conductors may be less expensive to install than insulated conductors, potentially costly problems may arise as a result of their use. Adequate clearances between conductors and/or other grounded objects may not be sustainable during adverse weather conditions (i.e., storms and high winds). As a result, the potential for flashover caused by conductors contacting one another or another object may be increased. Another source of flashover may be caused by large birds and animals which have sufficient size to make contact with a hot conductor and a grounded object or other conductor. In addition, falling trees and tree branches may cause contact between hot conductors and ground, resulting in flashover.

Flashover may result in a power outage which is undesirable to electric power suppliers and to consumers. For existing power transmission systems, electric power suppliers may find it desirable to replace bare conductors with insulated ones in order to eliminate the chance of flashover. Unfortunately, the cost of replacing bare conductors with insulated conductors may be expensive. Furthermore, an interruption in the delivery of power may be required to replace the conductors. This may be economically disadvantageous to an electric power supplier as well as being undesirable to electric power consumers.

SUMMARY OF THE INVENTION

According to embodiments of the present invention, an electrically insulating power transmission line cover for protecting an electrical power line includes an elongate, flexible panel, an elongate first edge portion, and an elongate second edge portion. The flexible panel has opposed inner and outer surfaces and laterally opposed first and second longitudinally extending side edges. The first edge portion is integral with the first side edge and includes an elongate first latch feature. The second edge portion is integral with the second side edge opposite the first edge portion and includes an elongate second latch feature. The cover further includes an elongate inner creepage extender wall forming a part of one of the first and second edge portions, and an elongate outer creepage extender wall forming a part of one of the first and second edge portions. The cover is configured to be placed in an installed position wherein the flexible panel is wrapped about the electrical power line and the first and second edge portions are joined together to form a longitudinally extending chamber containing the electrical power line. When the first and second edge portions are joined together, they form a longitudinally extending closure seam wherein the first and second latch features are coupled and the first and second edge portions form an electrical creepage path extending from the chamber to an exterior boundary of the cover along the inner creepage extender wall, between the first and second latch features, and along the outer creepage extender wall.

According to some embodiments, the first edge portion includes the inner creepage extender wall, the outer creepage extender wall, and an elongate male latch feature interposed between the inner and outer creepage extender walls. An elongate inner slot is defined between the inner creepage extender wall and the male latch feature, and an elongate outer slot is defined between the male latch feature and the outer creepage extender wall. The second edge portion includes an elongate inner latch wall, and an elongate outer latch wall, the inner and outer latch walls defining an elongate latch slot therebetween. In the longitudinally extending closure seam, the inner creepage extender wall, the inner latch wall, the male latch feature, the outer latch wall, and the outer creepage extender wall sequentially overlap one another to form the electrical creepage path extending from the chamber to the exterior boundary of the cover. The electrical creepage path includes: a first section defined between the inner creepage extender wall and the inner latch wall; a second section defined between the inner latch wall and the male latch feature; a third section defined between the male latch feature and the outer latch wall; and a fourth section defined between the outer latch wall and the outer creepage extender wall.

According to method embodiments of the present invention, a method for protecting an electrical power line includes providing an electrically insulating power transmission line cover including an elongate, flexible panel, an elongate first edge portion, and an elongate second edge portion. The flexible panel has opposed inner and outer surfaces and laterally opposed first and second longitudinally extending side edges. The first edge portion is integral with the first side edge. The first edge portion includes: an elongate inner creepage extender wall; an elongate outer creepage extender wall; and an elongate male latch feature interposed between the inner and outer creepage extender walls. An elongate inner slot is defined between the inner creepage extender wall and the male latch feature, and an elongate outer slot is defined between the male latch feature and the outer creepage extender wall. The second edge portion is integral with the second side edge opposite the first edge portion. The second edge portion includes: an elongate inner latch wall; and an elongate outer latch wall. The inner and outer latch walls define an elongate latch slot therebetween. The method further includes mounting the cover in an installed position on the electrical power line wherein the flexible panel is wrapped about the electrical power line and the first and second edge portions are joined together to form a longitudinally extending chamber containing the electrical power line. When the first and second edge portions are joined together, they form a longitudinally extending closure seam wherein the inner creepage extender wall, the inner latch wall, the male latch feature, the outer latch wall, and the outer creepage extender wall sequentially overlap one another to form an electrical creepage path extending from the chamber to an exterior boundary of the cover, the electrical creepage path including: a first section defined between the inner creepage extender wall and the inner latch wall; a second section defined between the inner latch wall and the male latch feature; a third section defined between the male latch feature and the outer latch wall; and a fourth section defined between the outer latch wall and the outer creepage extender wall.

According to embodiments of the present invention, a protected power transmission line assembly includes an elongate electrical power line and an electrically insulating power transmission line cover. The cover includes an elongate, flexible panel, an elongate first edge portion, and an elongate second edge portion. The flexible panel has opposed inner and outer surfaces and laterally opposed first and second longitudinally extending side edges. The first edge portion is integral with the first side edge. The first edge portion includes: an elongate inner creepage extender wall; an elongate outer creepage extender wall; and an elongate male latch feature interposed between the inner and outer creepage extender walls. An elongate inner slot is defined between the inner creepage extender wall and the male latch feature, and an elongate outer slot is defined between the male latch feature and the outer creepage extender wall. The second edge portion is integral with the second side edge opposite the first edge portion. The second edge portion includes: an elongate inner latch wall; and an elongate outer latch wall, the inner and outer latch walls defining an elongate latch slot therebetween. The cover is mounted on the electrical power line in an installed position wherein the flexible panel is wrapped about the electrical power line and the first and second edge portions are joined together to form a longitudinally extending chamber containing the electrical power line. When the first and second edge portions are joined together, they form a longitudinally extending closure seam wherein the inner creepage extender wall, the inner latch wall, the male latch feature, the outer latch wall, and the outer creepage extender wall sequentially overlap one another to form an electrical creepage path extending from the chamber to an exterior boundary of the cover, the electrical creepage path including: a first section defined between the inner creepage extender wall and the inner latch wall; a second section defined between the inner latch wall and the male latch feature; a third section defined between the male latch feature and the outer latch wall; and a fourth section defined between the outer latch wall and the outer creepage extender wall.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
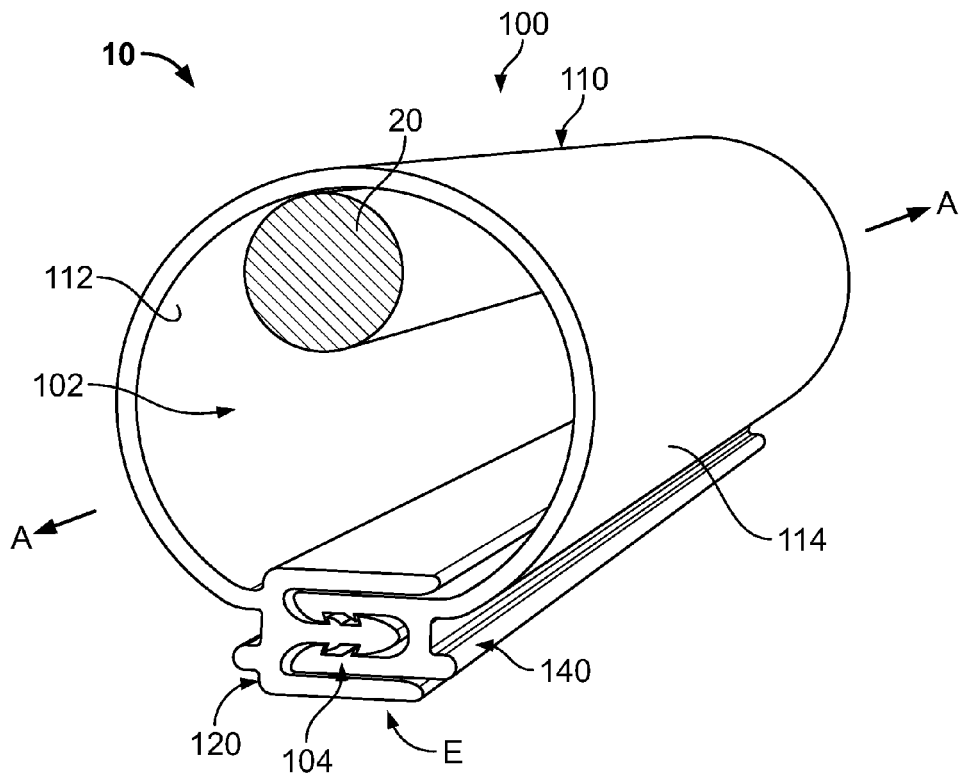
FIG. 1 is a perspective view of a protected power transmission line assembly including a power transmission line cover according to embodiments of the present invention in an installed configuration.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

As used herein, "electrical creepage distance" and "creepage distance" refer to the shortest path between two conductive parts or points, or between a conductive part and the bounding surface of the equipment, measured along the surface of the insulation.

Figure 2:
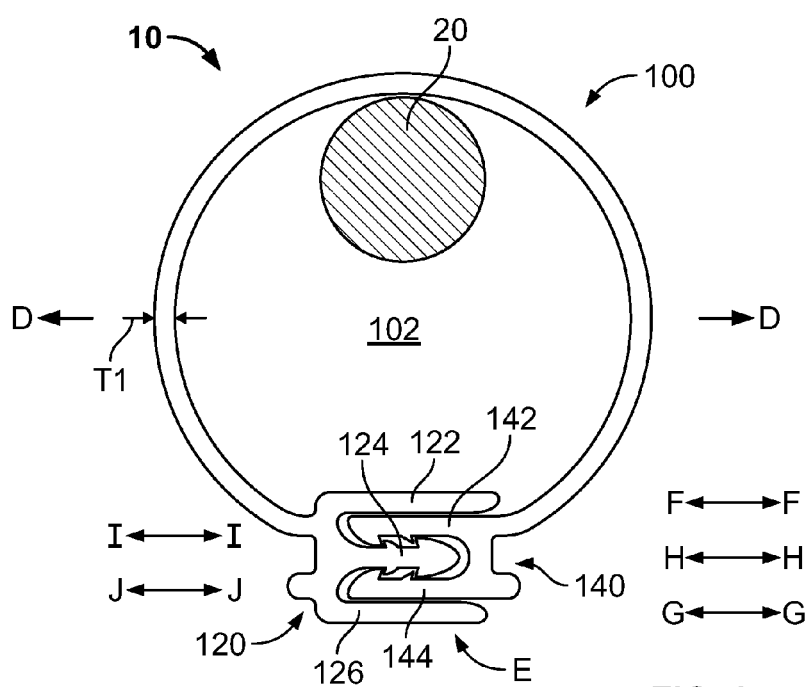
FIG. 2 is an end view of the protected power transmission line assembly of FIG. 1.
Figure 3:
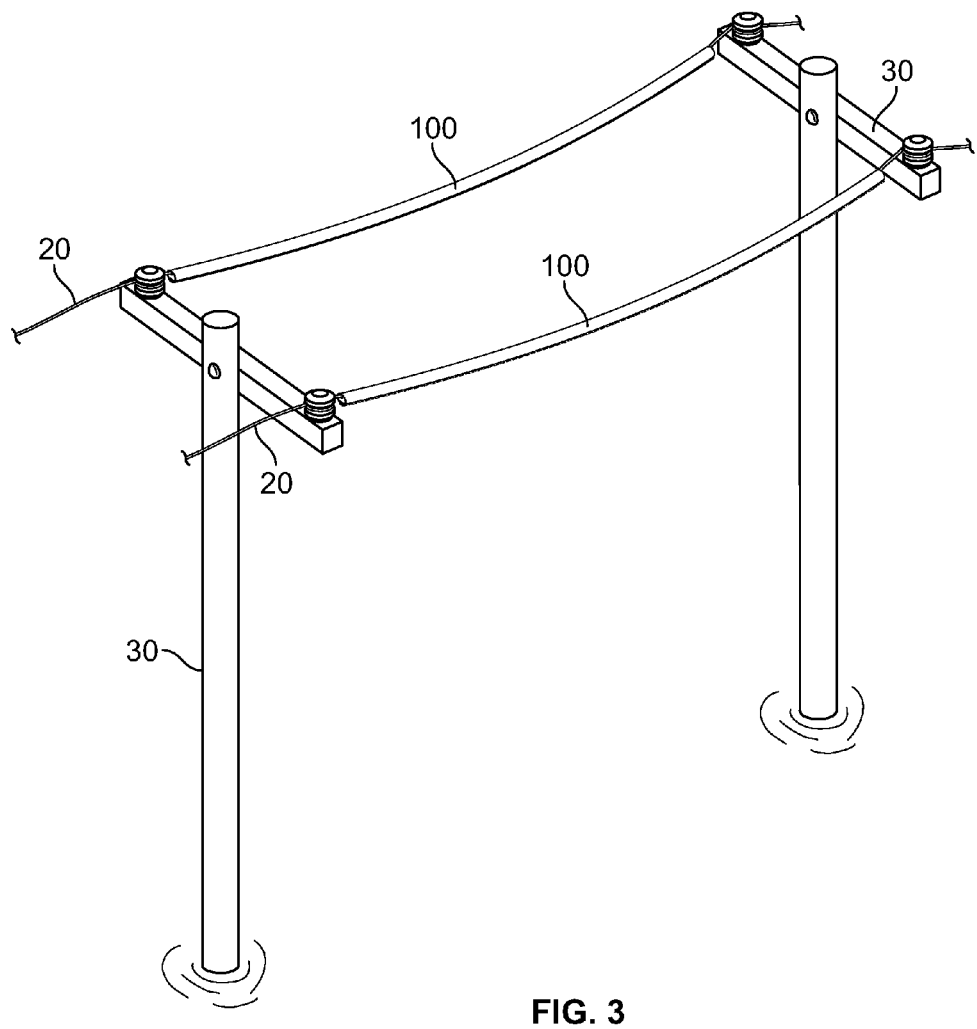
FIG. 3 is a perspective view of a pair of the protected power transmission line assemblies of FIG. 1 suspended from support structures.
Figures 4, 5:
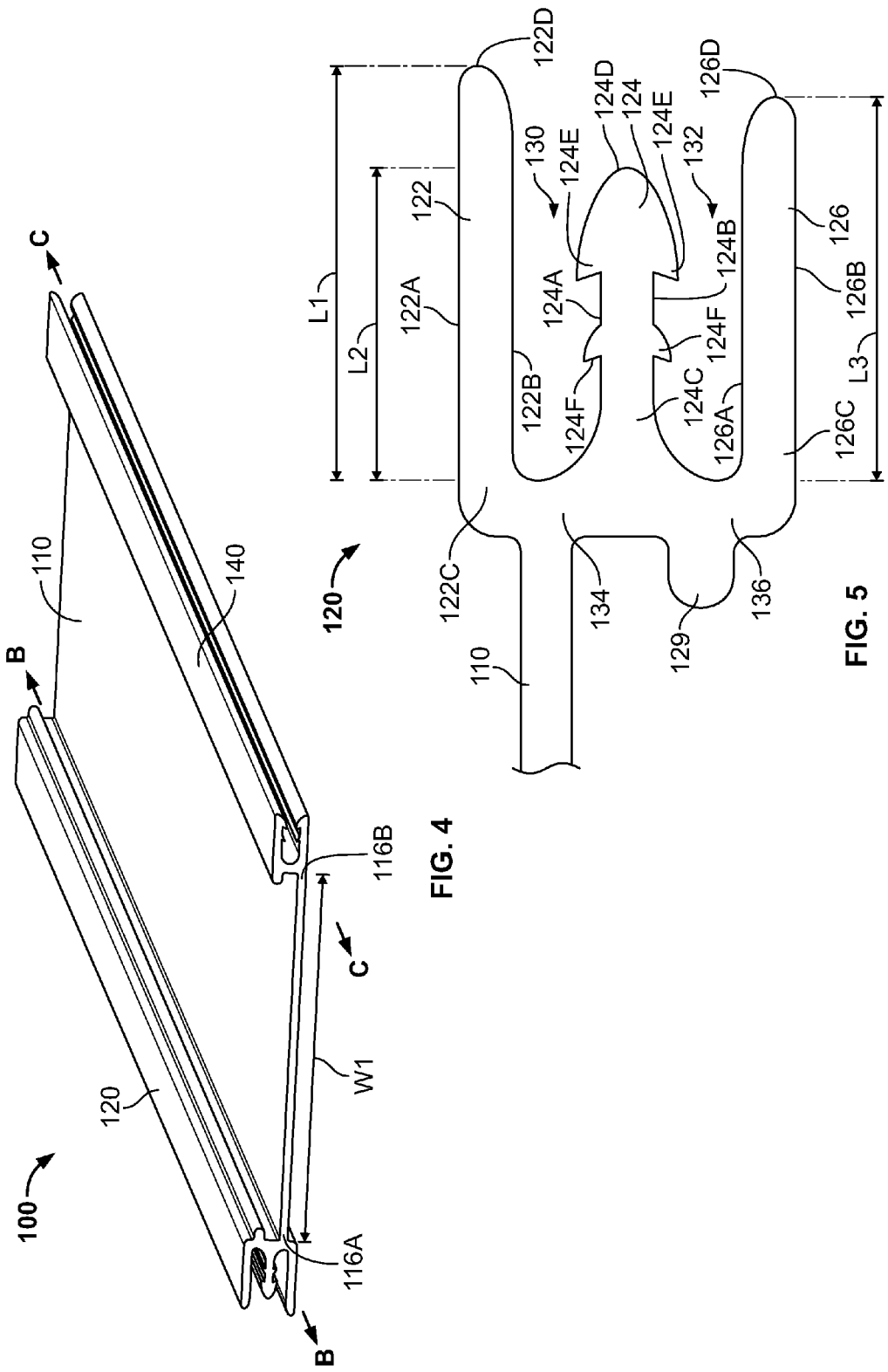
FIG. 4 is a perspective view of the power transmission line cover of FIG. 1 in an open or uninstalled configuration.
FIG. 5 is an enlarged, end view of a first edge portion forming a part of the power transmission line cover of FIG. 1.
Figure 6:
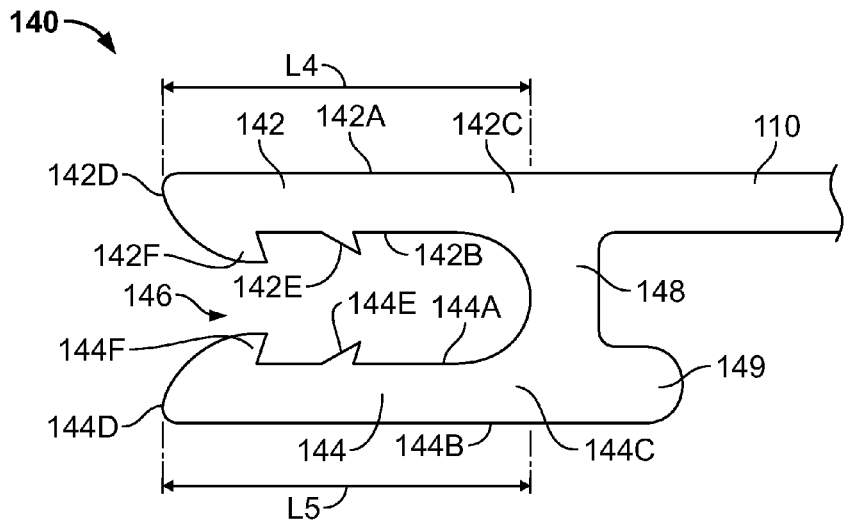
FIG. 6 is an enlarged, end view of a second edge portion forming a part of the power transmission line cover of FIG. 1.

With reference to FIGS. 1-7, a flashover protection or power transmission line cover 100 according to embodiments of the present invention is shown therein in an uninstalled configuration (FIGS. 4-6) and an installed configuration (FIGS. 1-3 and 7). The cover 100 can be mounted on an electrical power transmission line 20 in its installed configuration as shown in FIGS. 1-3 to form a protected power transmission line assembly 10. According to some embodiments, the transmission line 20 is a medium voltage power line (i.e., an electrical power transmission cable or conductor that is rated for and has applied thereto in service a voltage in the range of from about 15 kV to 35 kV). According to some embodiments, the transmission line 20 is a non-insulated or uninsulated conductor. The transmission line 20 can be suspended above ground by support structures 30 (e.g., utility poles) with the cover 100 covering spans of the transmission line 20 between (and, in some embodiments, on) the support structures 30.

The cover 100 includes a continuous, flexible panel 110, a first edge portion 120 integral with and extending along a first longitudinal side edge 116A of the panel 110, and a second edge portion 140 integral with and extending along an opposing second longitudinal side edge 116B of the panel 110. In the installed configuration, the cover 100 defines a longitudinally extending chamber 102 defining a cover lengthwise axis A-A and has a lateral axis D-D extending substantially perpendicular to the lengthwise axis A-A. The edge portion 120 defines or extends along a first edge portion axis B-B, and the second edge portion 140 defines or extends along a second edge portion axis C-C. The axes B-B and C-C extend substantially parallel to the cover axis A-A. The edge portions 120, 140 collectively include a locking mechanism 104. According to some embodiments, the panel 110 and the edge portions 120, 140 are substantially coextensive along the axis A-A.

The first edge portion 120 and the second edge portion 140 are configured to be joined together to form the installed or closed configuration of the cover 100. In some embodiments and as illustrated, the edge portions 120, 140 are configured to be removably coupled by the locking mechanism 104 so that they can be disengaged to allow opening of the cover 100 and, if desired, removal of the cover 100 from the transmission line 20 at a later time.

The panel 110 has an inner surface 112 and an opposing outer surface 114 extending from edge 116A to edge 116B. According to some embodiments, the panel 110 has a nominal thickness T1 (FIG. 2) in the range of from about 1.5 to 2.2 mm. According to some embodiments, the panel 110 has a width W1 (FIG. 4) in the range of from about 120 mm to 130 mm.

The first edge portion 120 includes an elongate inner creepage extender wall 122, an elongate male latch feature wall 124, an elongate outer creepage extender wall 126, an elongate guide rib 129, an elongate inner connector wall 134 connecting the walls 122 and 124, and an elongate outer connector wall 136 connecting the walls 124 and 126. The walls 122, 124 and 134 define an elongate, laterally opening, longitudinally extending inner slot 130. The walls 124, 126 and 136 define an elongate, laterally opening, longitudinally extending outer slot 132. The walls, guide rib and slots 122, 124, 126, 129, 130, 132, 134, and 136 each extend longitudinally continuously generally parallel to the axis B-B.

The inner creepage extender wall 122 has an inner surface 122A, an opposing outer surface 122B, a base end 122C and a free end 122D. The wall 122 extends laterally along a lateral axis F-F (defined by the ends 122C and 122D) substantially parallel to the cover lateral axis D-D.

The outer creepage extender wall 126 has an inner surface 126A, an opposing outer surface 126B, a base end 126C and a free end 126D. The wall 126 extends laterally along a lateral axis G-G (defined by the ends 126C and 126D) substantially parallel to the cover lateral axis D-D.

The male latch feature wall 124 has an inner surface 124A, an opposing outer surface 124B, a base end 124C and a free or leading end 124D. A pair of opposed leading latch features or barbs 124E extend along the surfaces 124A, 124B proximate the leading end 124D. A pair of opposed trailing latch features or barbs 124F extend along the surfaces 124A, 124B proximate the base end 124C. The wall 124 extends laterally along a lateral axis H-H (defined by the ends 124C and 124D) substantially parallel to the cover lateral axis D-D.

The second edge portion 140 includes an elongate inner female latch wall 142 and an elongate outer female latch wall 144 joined by a connector wall 148, and an elongate guide rib 149. The walls 142, 144 and 148 define an elongate female latch slot 146 having an elongate, longitudinally extending lateral side opening 146A. The wall, guide rib and slot 142, 144, 146, 148 and 149 each extend longitudinally continuously generally parallel to the axis C-C. The second edge portion 140 and the male latch feature wall 124 together form the locking mechanism 104.

The inner female latch wall 142 has an inner surface 142A and an opposing outer surface 142B. The wall 142 is joined to the connecting wall 148 at a base end 142C and extends laterally to a free end 142D. An inner latch feature or barb 142E and an outer latch feature or barb 142F project from the surface 142B. The wall 142 extends laterally along a lateral axis I-I (defined by the ends 142C and 142D) substantially parallel to the cover lateral axis D-D.

The outer female latch wall 144 has an inner surface 144A and an opposing outer surface 144B. The wall 144 is joined to the connecting wall 148 at a base end 148C and extends laterally to a free end 144D. An inner latch feature 144E and an outer latch feature or barb 144F project from the surface 144A. The wall 144 extends laterally along a lateral axis J-J (defined by the ends 144C and 144D) substantially parallel to the cover lateral axis D-D.

According to some embodiments and as shown, each of the creepage extender walls 122 and 126 is substantially planar and lies in a plane defined by its longitudinal and lateral axes. In some embodiments, each of the walls 122, 124, 126, 142 and 144 is substantially planar and lies in a plane defined by its longitudinal and lateral axes.

The cover 100 may be formed of any suitable material or materials. According to some embodiments, the cover 100 is formed from a polymeric material. According to some embodiments, the cover 100 is formed of a polymeric material having a high dielectric strength including, but not limited to medium or high density polyethylene. According to some embodiments, the material has a dielectric strength in the range of from about 550 volts per mil (V/mil) to 700 V/mil. In some embodiments the cover 100 is formed of a material having good ultra-violet (UV) radiation protection, and having good tracking, erosion and abrasion resistance. As is known to those skilled in the art, "tracking" is a permanent damage to insulating material that leaves a carbonized conductive path that deteriorates the insulating properties of the material. According to some embodiments, the material out of which the cover 100 is formed has a minimum life of 20 years within a 90° C. environment.

The cover 100 can be formed using any suitable technique. According to some embodiments, the cover 100 is extruded. In other embodiments, the cover 100 is molded. According to some embodiments, the flexible panel 110, the edge portion 120 and the edge portion 140 are unitarily extruded or otherwise formed such that they form a unitarily formed, monolithic structure.

According to some embodiments, the inner creepage extender wall 122 has a length L1 (FIG. 5) in the range of from about 15 to 17 mm. According to some embodiments, the male latch feature 124 has a length L2 in the range of from about 11.5 to 13.0 mm. According to some embodiments, the outer creepage extender wall 126 has a length L3 in the range of from about 14 to 16 mm. In some embodiments, the inner female latch wall 142 has a length L4 (FIG. 6) in the range of from about 11 to 13 mm. According to some embodiments, the outer female latch wall 144 has a length L5 in the range of from about 11 to 13 mm. In some embodiments, the inner creepage extender wall 122 and the outer creepage extender wall 126 have substantially the same length.

The cover 100 may be used in the following manner in accordance with methods of the present invention. The cover 100 in an open configuration is laid over or along the transmission line 20 and then wrapped circumferentially about the transmission line 20 to bring the edge portions 120 and 140 into engagement to form a seam E. The edge portions 120 and 140 are forced together laterally such that the male latch feature 124 is received in the slot 146, the latch wall 142 is received in the slot 130, the latch wall 144 is received in the slot 132, the barbs 124E interlock with the barbs 142E, 144E, and the barbs 124F interlock with the barbs 142F, 144F. The latch walls 142, 144 and/or the barbs may elastically deflect to permit insertion of the latch features 124 into the slot 146.

According to some embodiments, the cover 100 is provided from an extended length stored on a roll from which it is paid out and cut to length. The cover 100 can be installed by hand, using a manual tool, using a powered tool, and/or using a remotely operated tool. The guide ribs 129, 149 may assist in guiding an installation tool.

Figure 7:
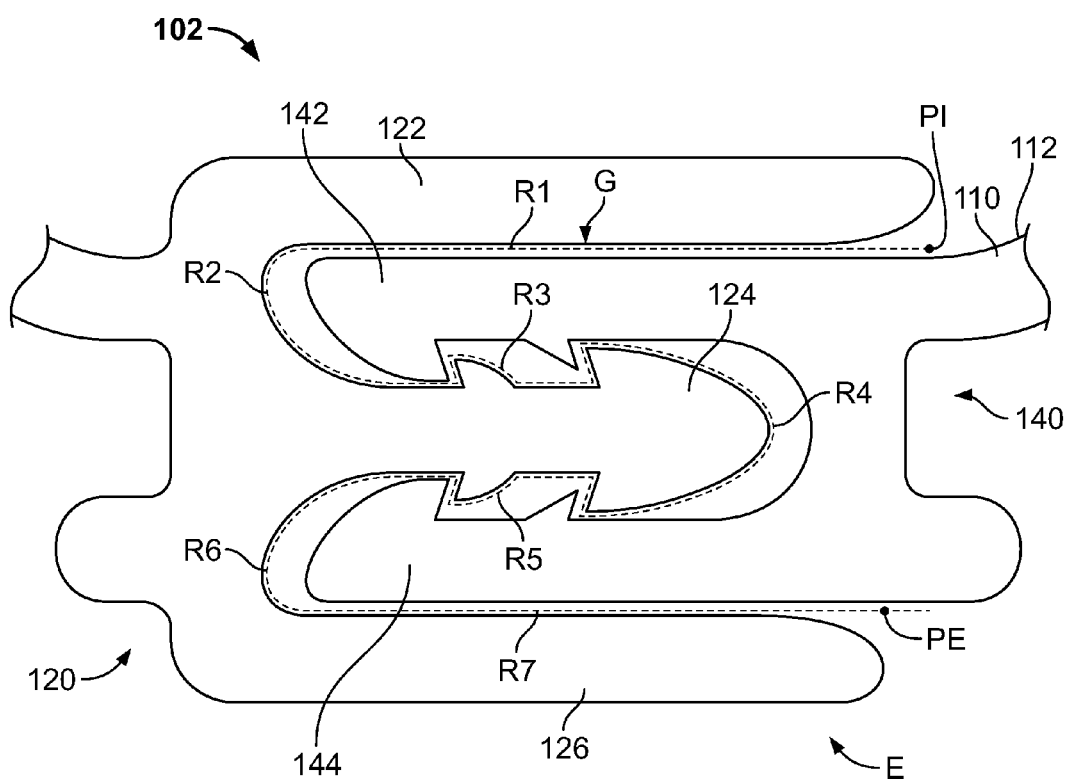
FIG. 7 is a greatly enlarged, end view of the power transmission line cover of FIG. 1 in the installed position, wherein the first and second edge portions are engaged to form a seam and an electrical creepage path is illustrated.

With reference to FIG. 7, the interposed, interleaved or interdigitated walls 122, 142, 124, 144 and 126 of the engaged edge portions 120, 140 define a serpentine electrical creepage path CP extending continuously from an interior point PI contiguous with the conductor chamber 102 to an exterior point PE contiguous with the bounding surface of the cover 100. More particularly, the creepage path CP follows an interface region or gap G defined between the mating surfaces of the first edge portion 120 and the second edge portion 140. The creepage path CP includes a first leg segment or section R1 defined between the overlapping surfaces of the walls 122 and 142, a first bend segment or section R2 between the walls 122 and 124, a second leg segment or section R3 defined between the overlapping surfaces of the walls 142 and 124, a second bend segment or section R4 between the walls 142 and 144, a third leg segment or section R5 defined between the overlapping surfaces of the walls 124 and 144, a third bend segment or section R6 between the walls 124 and 126, and a fourth leg segment or section R7 defined between the overlapping surfaces of the walls 144 and 126.

According to some embodiments, the creepage path CP has a length in the range of from about 40 to 90 mm and, in some embodiments, from about 60 to 70 mm.

The closure configuration of the seam E and the creepage path CP provide an extended creepage distance as compared known prior art designs. This extended creepage distance can inhibit electrical flashover or arcing into the conductor chamber 102 between the outer boundary of the cover 100 and the inner surface 112. Such flashover may result if, for example, a grounded object comes into contact with the cover 100 near the seam E. A high electrical stress may exist between the conductor 20 and the grounded object, which may result in flashover from the conductor 20 to the grounded object between the interior point PI and the exterior point PE.

By providing such an extended electrical creepage distance, the cover 100 may provide greater voltage protection and/or qualify for a greater voltage protection rating without the use of mastic filling in the seam. This may be beneficial because mastic provided in the seam may make installation more difficult. However, in some embodiments, a sealant or mastic may be provided in the seam to extend the voltage range of the cover.

In some embodiments, the barbs 124E or the barbs 124F and the barbs 142E or the barbs 142F may be omitted.

Embodiments of the present invention have been described above and, although specific terms are employed, they are used in a generic and descriptive sense only and not for purposes of limitation. The following claims are provided to ensure that the present application meets all statutory requirements as a priority application in all jurisdictions and shall not be construed as setting forth the scope of the present invention.

That which is claimed is:

1. An electrically insulating power transmission line cover for protecting an electrical power line, the cover comprising:
    an elongate, flexible panel having opposed inner and outer surfaces and laterally opposed first and second longitudinally extending side edges;
    an elongate first edge portion integral with the first side edge and including an elongate first latch feature;
    an elongate second edge portion integral with the second side edge opposite the first edge portion and including an elongate second latch feature;
    an elongate inner creepage extender wall forming a part of one of the first and second edge portions;
    an elongate outer creepage extender wall forming a part of one of the first and second edge portions;
    a leading barb on the male latch feature proximate a free end of the male latch feature;
    a trailing barb on the male latch feature proximate base end of the male latch feature;
    an inner latch feature on one of the inner and outer latch walls configured to releasably interlock with the leading barb: and
    an outer latch feature on one of the inner and outer latch walls configured to releasable interlock with the trailing barb;
    wherein:
        the cover is configured to be placed in an installed position wherein the flexible panel is wrapped about the electrical power line and the first and second edge portions are joined together to form a longitudinally extending chamber containing the electrical power line; and
        when the first and second edge portions are joined together, they form a longitudinally extending closure seam wherein the first and second latch features are coupled and the first and second edge portions form an electrical creepage path extending from the chamber to an exterior boundary of the cover along the inner creepage extender wall, between the first and second latch features, and along the outer creepage extender wall.

2. The cover of claim 1 wherein:
the first edge portion includes:
   the inner creepage extender wall;
   the outer creepage extender wall; and
   an elongate male latch feature interposed between the inner and outer creepage extender walls, wherein an elongate inner slot is defined between the inner creepage extender wall and the male latch feature, and an elongate outer slot is defined between the male latch feature and the outer creepage ex,ender wall;
the second edge portion includes:
   an elongate inner latch wall; and
   an elongate outer latch wall, the inner and outer latch walls defining an elongate latch slot therebetween; and
in the longitudinally extending closure seam, the inner creepage extender wall, the inner latch wall, the male latch feature, the outer latch wall, and the outer creepage extender wall sequentially overlap one another to form the electrical creepage path extending from the chamber to the exterior boundary of the cover, the electrical creepage path including:
   a first section defined between the inner creepage extender wall and the inner latch wall;
   a second section defined between the inner latch wall and the male latch feature;
   a third section defined between the male latch feature and the outer latch wall; and
   a fourth section defined between the outer latch wall and the outer creepage extender wall.

3. The cover of claim 1 wherein, in the closure seam, the outer creepage extender wall lies immediately adjacent and in direct contact with the outer latch wall.

4. The cover of claim 1 wherein, in the closure seam, the inner creepage extender wall lies immediately adjacent and in direct contact with the inner latch wall.

5. The cover of claim 1 wherein the inner and outer creepage extender walls are each substantially planar and, in the closure seam, extend substantially parallel to one another.

6. The cover of claim 1 wherein the inner and outer creepage extender walls and the inner and outer latch walls are each substantially planar and, in the closure seam, extend substantially parallel to one another.

7. The cover of claim 1 including at least one barb on at least one of the male latch feature and the inner and outer latch walls configured to releasably interlock the male latch feature with the second edge portion.

8. The cover of claim 1 wherein at least one of the first and second edge portions includes a guide rib to engage an installation tool.

9. The cover of claim 1 wherein the cover is formed of a polymeric material having a dielectric strength in the range of from about 550 to 700 V/mil.

10. A method for protecting an electrical power line, the method comprising:
providing an electrically insulating power transmission line cover including:
   an elongate, flexible panel having opposed inner and outer surfaces and laterally opposed first and second longitudinally extending side edges;
   an elongate first edge portion integral with the first side edge, the first edge portion including:
      an elongate inner creepage extender wall;
      an elongate outer creepage extender wall; and
      an elongate male latch feature interposed between the inner and outer creepage extender walls, wherein an elongate inner slot is defined between the inner creepage extender wall and the male latch feature, and an elongate outer slot is defined between the male latch feature and the outer creepage extender wall; and
   an elongate second edge portion integral with the second side edge opposite the first edge portion, the second edge portion including:
      an elongate inner latch wall; and
      an elongate outer latch wall, the inner and outer latch walls defining an elongate latch slot therebetween; and
mounting the cover in an installed position on the electrical power line wherein the flexible panel is wrapped about the electrical power line and the first and second edge portions are joined together to form a longitudinally extending chamber containing the electrical power line;
wherein, when the first and second edge portions are joined together, they form a longitudinally extending closure seam wherein the inner creepage extender wall, the inner latch wall, the male latch feature, the outer latch wall, and the outer creepage extender wall sequentially overlap one another to form an electrical creepage path extending from the chamber to an exterior boundary of the cover, the electrical creepage path including:
   a first section defined between the inner creepage extender wall and the inner latch wall;
   a second section defined between the inner latch wall and the male latch feature;
   a third section defined between the male latch feature and the outer latch wall; and
   a fourth section defined between the outer latch wall and the outer creepage extender wall.

11. The method of claim 10 wherein no sealant is provided in the seam.

12. The method of claim 11 wherein no mastic is provided in the seam.

13. The method of claim 10 wherein, in the closure scam, the outer creepage extender wall lies immediately adjacent and in direct contact with the outer latch wall.

14. The method of claim 10 wherein, in the closure seam, the inner creepage extender wall lies immediately adjacent and in direct contact with the inner latch wall.

15. The method of claim 10 wherein the inner and outer creepage extender walls are each substantially planar and, in the closure seam, extend substantially parallel to one another.

16. The method of claim 10 wherein the inner and outer creepage extender walls and the inner and outer latch walls are each substantially planar and in the closure seam, extend substantially parallel to one another.

17. The method of claim 10 including at least one barb on at least one of the male latch feature and the inner and outer latch walls configured to releasably interlock the male latch feature with the second edge portion.

18. A protected power transmission line assembly comprising:
an elongate electrical power line; and
an electrically insulating power transmission line cover including:

an elongate, flexible panel having opposed inner and outer surfaces and laterally opposed first and second longitudinally extending side edges;

an elongate first edge portion integral with the first side edge, the first edge portion including:
- an elongate inner creepage extender wall;
- an elongate outer creepage extender wall; and
- an elongate mate latch feature interposed between the inner and outer creepage extender walls, wherein an elongate inner slot is defined between the inner creepage extender wall and the male latch feature, and an elongate outer slot is defined between the male latch feature and the outer creepage extender wall; and an elongate second edge portion integral with the second side edge opposite the first edge portion, the second edge portion including:
- an elongate inner latch wall and
- an elongate outer latch wall, the inner and outer latch walls defining an elongate latch slot therebetween; and wherein:
the cover is mounted on the electrical power line in an installed position wherein the flexible panel is wrapped about the electrical power line and the first and second edge portions are joined together to form a longitudinally extending chamber containing the electrical power line; and when the first and second edge portions are joined together, they form a longitudinally extending closure seam wherein the inner creepage extender wall, the inner latch wall, the male latch feature, the outer latch wall, and the outer creepage extender wall sequentially overlap one another to form an electrical creepage path extending from the chamber to an exterior boundary of the cover, the electrical creepage path including:
- a first section defined between the inner creepage extender wall and the inner latch wall;
- a second section defined between the inner latch wall and the male latch feature;
- a third section defined between the male latch feature and the outer latch wall; and
- a fourth section defined between the outer latch wall and the outer creepage extender wall.

19. The protected power transmission line assembly of claim 18 wherein there is no sealant in the seam.

20. The protected power transmission line assembly of claim 19 wherein there is no mastic in the seam.

* * * * *